United States Patent [19]
Durrant

[11] 3,894,396
[45] July 15, 1975

[54] CONTROL SYSTEM FOR A POWER PRODUCING UNIT

[75] Inventor: Oliver W. Durrant, Akron, Ohio

[73] Assignee: The Babcock & Wilcox Company, New York, N.Y.

[22] Filed: Oct. 10, 1973

[21] Appl. No.: 404,922

[52] U.S. Cl. .................................................. 60/665
[51] Int. Cl. .......................................... F01k 13/02
[58] Field of Search .......................... 122/479 A; 60/660–667

[56] References Cited
UNITED STATES PATENTS

| | | | |
|---|---|---|---|
| 3,028,844 | 4/1962 | Durham et al. | 122/479 A |
| 3,040,719 | 6/1962 | Dickey | 122/479 A |
| 3,310,683 | 3/1967 | Hottenstine | 60/106 X |
| 3,417,737 | 12/1968 | Shinskey | 60/106 X |
| 3,545,207 | 12/1970 | Barber | 60/106 |
| 3,550,562 | 12/1970 | Stohmeyer, Jr. | 60/105 X |

Primary Examiner—Martin P. Schwadron
Assistant Examiner—Allen M. Ostrager
Attorney, Agent, or Firm—John F. Luhrs

[57] ABSTRACT

A control system for a power producing unit comprising a separate control loop for each controlled variable all operated in parallel in accordance with power demand and wherein the operation of each control loop is separately modified by deviation of one or more parameters from normal.

18 Claims, 7 Drawing Figures

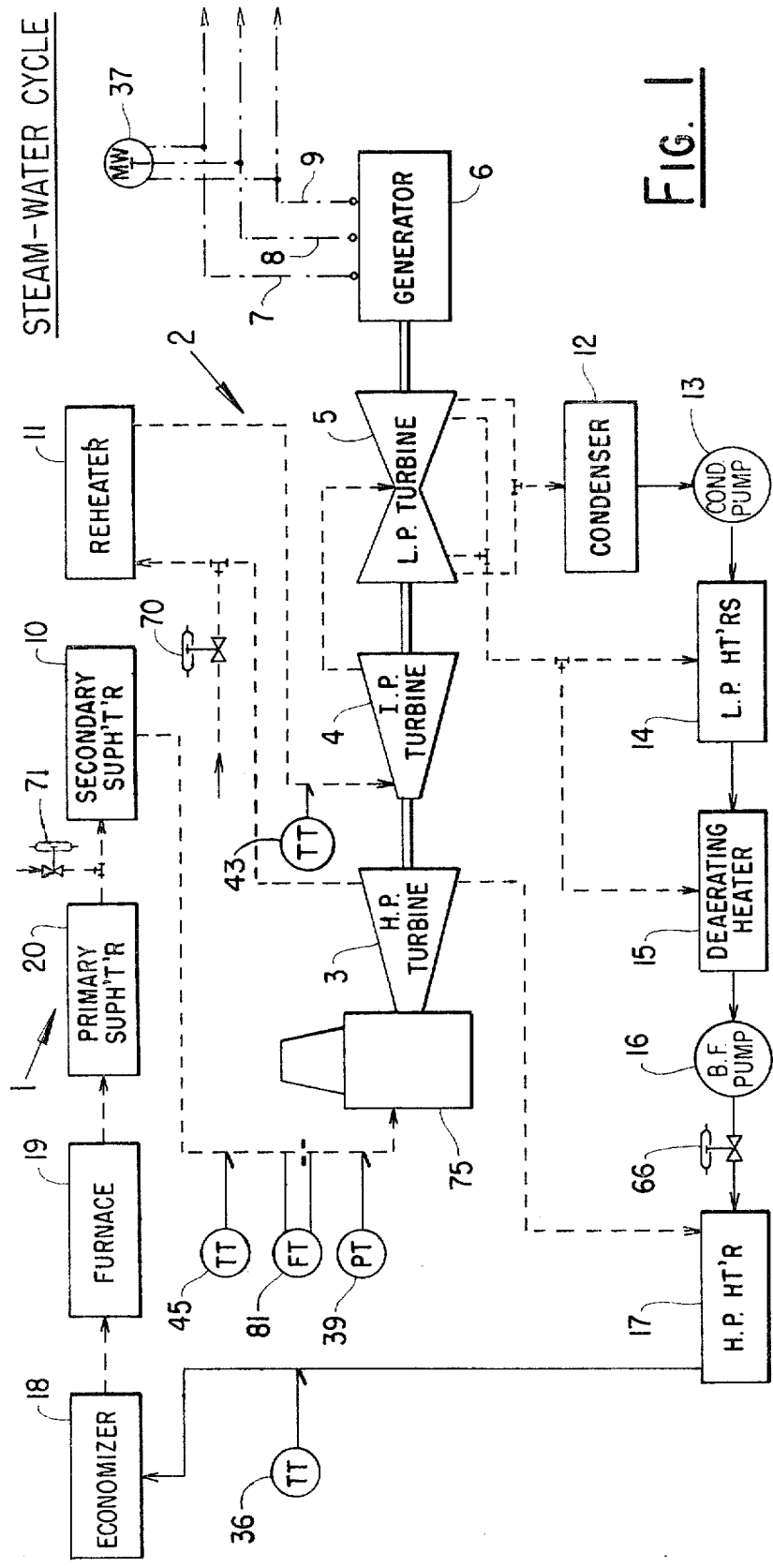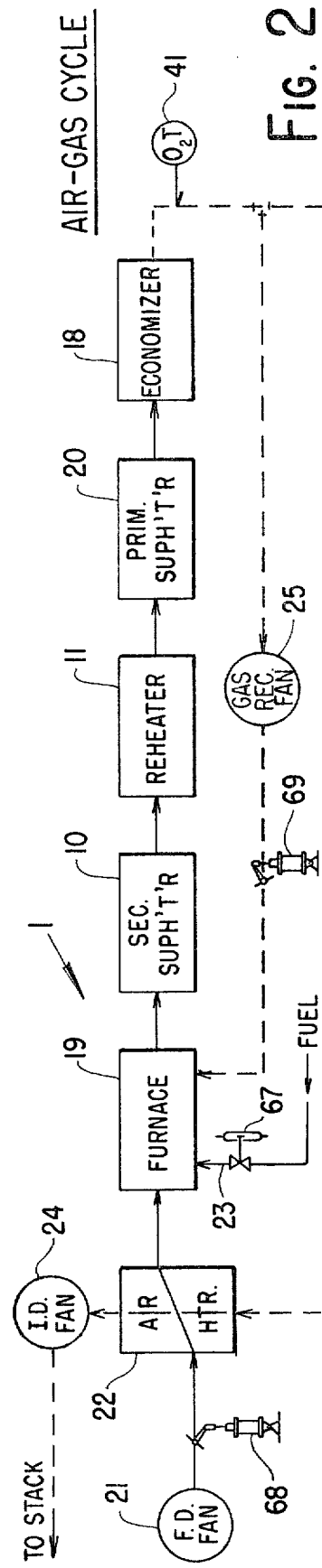

CONTROL SYSTEM FOR A POWER PRODUCING UNIT

This invention relates to a control system for large size power producing units and more particularly to a control system for large size fossil fuel fired electric power producing units such as found in modern central stations. As an order of magnitude such units may, for example, be rated at upwards of 1000 MW requiring at full load over 6,000,000 pounds of primary steam per hour at 2,500 psig and 1000°F. Customarily, in such units, the steam passes first through a high pressure turbine, thence through a reheater pass in the steam generator wherein the steam is raised to a hot reheat temperature of 1000°F, thence through an intermediate pressure turbine and thence through a low pressure turbine to a condenser.

In accordance with my invention a separate control loop is provided for each controlled variable, all operated in parallel in functional relationship to the desired power output of the power producing unit.

Further, in accordance with my invention, the functional relationship between desired power output and each controlled variable is modified in accordance with the departure of one or more parameters from desired, or predetermined values.

Further, in accordance with my invention, the functional relationship between desired power output and selected controlled variables is continuously corrected in accordance with any difference between desired and actual power outputs.

Further, in accordance with my invention, when applied to an electric power producing unit comprising a fossil fuel fired steam generator supplying steam to a turbine driving an electric generator, steam flow to the turbine, fuel to the steam generator, air to the steam generator, feed water to the steam generator, and flue gas recirculation to the steam generator are each separately controlled in parallel in accordance with the desired output of the electric generator, and each of said controlled variables is separately modified in accordance with the departure of one or more parameters from desired or predetermined values.

These and further objectives of my invention will be apparent as the description proceeds in connection with the drawings, in which:

IN THE DRAWINGS

FIG. 1 is a block diagram of the basic steam-water flow cycle of a typical single boiler - single turbine power producing unit from which the basic principles of my invention will be explained.

FIG. 2 is a block diagram of the air-gas cycle for the boiler shown in FIG. 1.

DETAILED DESCRIPTION

Figure 3:
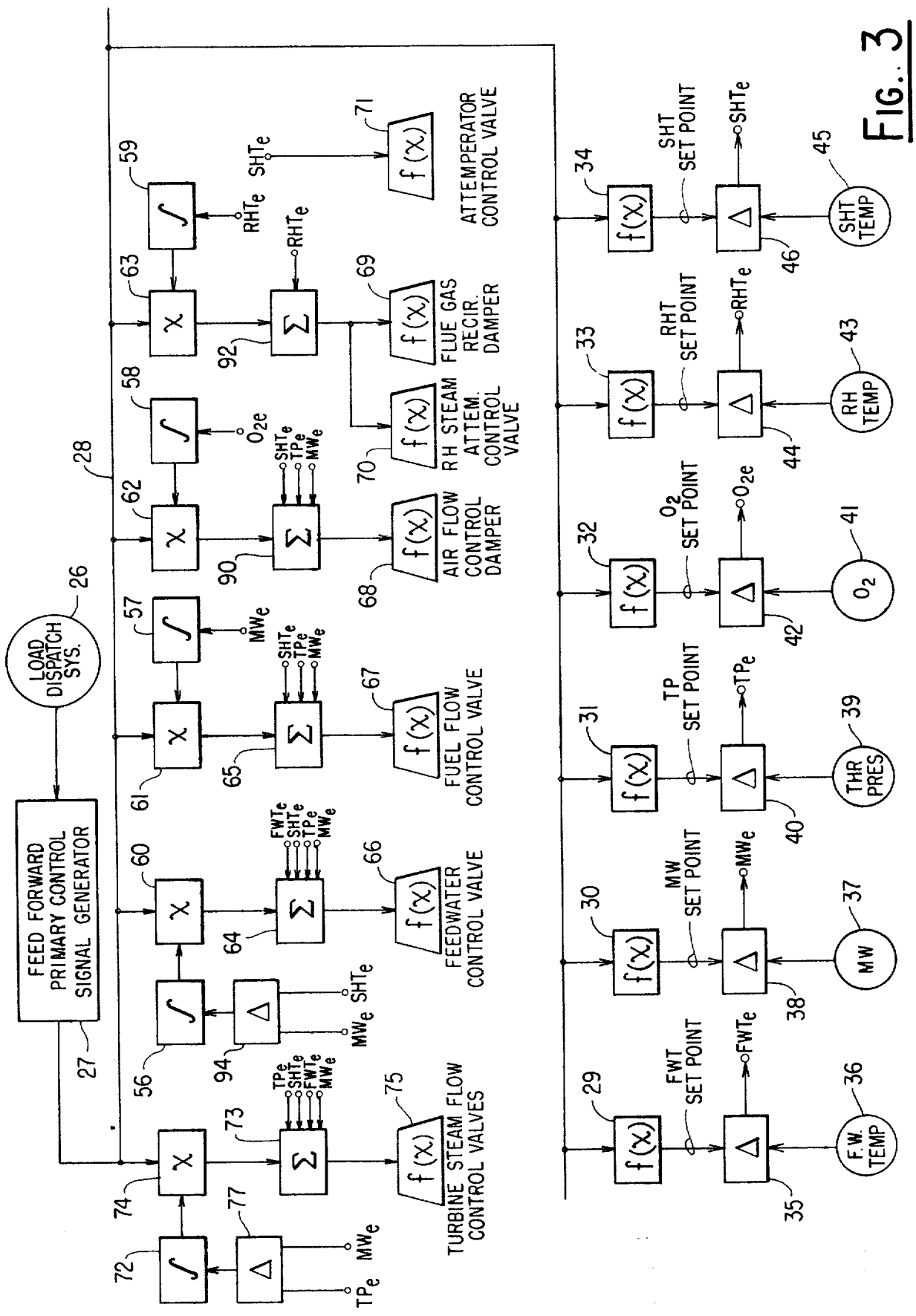
FIG. 3 is a logic diagram of the control system as applied to the power producing unit shown in FIGS. 1 and 2.

Referring to FIG. 1 there is shown the elementary steam-water cycle for a more or less conventional steam generator - turbine generator power producing unit comprising a steam generator, or boiler generally indicated at 1 and a turbine-generator unit generally indicated at 2, having a high pressure (HP) turbine 3, an intermediate pressure (IP) turbine 4 and a low pressure (LP) turbine 5. As shown, the HP turbine 3, IP turbine 4 and LP turbine 5 drive a single generator 6, producing electric power transmitted therefrom by conductors 7, 8 and 9. Alternately, each turbine unit may be arranged to drive a separate generator all feeding into a common bus. The particular arrangement of turbine-generator which may be used forms no part of the present invention.

Steam discharged from secondary superheater 10 of steam generator 1 passes through HP turbine 3, thence through reheater 11. The hot reheat steam then passes through IP turbine 4, LP turbine 5 and is discharged into condenser 12. Condensate from condenser 12 is pumped by condensate pump 13 through a low pressure heater string 14, heated by extraction steam from LP turbine 5, into deaerating heater 15 also heated by extraction steam. Feedwater is drawn from the deaerating heater 15 by boiler feed pump 16 and is discharged through high pressure heaters 17, also heated by extraction steam, into steam generator 1 shown as having an economizer 18, furnace 19 and primary superheater 20 in addition to secondary superheater 10 and reheater 11 previously mentioned.

Referring to FIG. 2 there is shown in elementary form the airgas cycle for the steam generator 1. Air for combustion, supplied by a forced draft fan 21, passes through an air heater 22 and is discharged into furnace 19. Fuel, which may be oil, gas, coal, or a combination thereof, is discharged into furnace 19 from any conventional means (not shown, but schematically represented by line 23). The gasses of combustion, or flue gas, as it is commonly called, leaving furnace 19, pass through secondary superheater 10, reheater 11, primary superheater 20, economizer 18, air heater 22 and induced draft fan 24 whence they are discharged to the atmosphere through a stack (not shown). Flue gas leaving the economizer 18 may also be recirculated into the furnace 19 by gas recirculating fan 25 as a means of partially or wholly controlling the temperature of the hot reheat steam discharged from reheater 11. In general, the rate of flow of recirculated gas is maintained in inverse proportion to the heat or energy input to the steam generator 1. The order shown in which the productss of combustion pass over the several heating sections is not the exclusive order. The order may be, for example, primary superheater, secondary superheater, and reheater: or secondary superheater, primary superheater, and reheater.

FIG. 3 shows, in elementary block diagram, the organization of the control system. The unit load demand may be established by an automatic load dispatch system, as shown at 26, or by other automatic or manual means, inputing to a primary control signal generator 27, the purpose of which is to generate a feed forward control signal corresponding to the desired energy output of the power producing unit. The feed forward primary control signal transmitted over signal conductor 28, adjusts, in parallel, through individual control loops, steam flow to the HP turbine 3, rate of feedwater flow to steam generator 1, rate of fuel flow, rate of air flow, and rate of flow of recirculated flue gas to the furnace 19 to substantially maintain the actual energy output of the power producing unit equal to the desired energy output. Each control loop is provided with individual modifying signals, as hereinafter described in more detail, so that actual energy output of the power producing unit is maintained precisely equal to the desired energy output and factors such as, but not limited to, superheat steam temperature, reheat steam temperature, throttle pressure and the like are maintained at set point values.

In reference to the drawings it should be noted that conventional control logic symbols have been used. The control commponents, or hardware, as it is sometimes called, which such symbols represent, are commercially available and their opertion well understood by those familiar with the art. Furthermore, conventional logic symbols have been used to avoid identification of the control system with a particular type of control, such as pneumatic, hydraulic, electronic, electric, or a combination of these, as the invention may be incorporated in any one of these types. Further, to be noted, is that the primary controllers shown in the logic diagrams have been referenced into FIGS. 1 and 2 as have the final control elements. Further, in the interest of brevity, conventional local feedback control loops customarily associated with final control elements have been omitted, their purpose being to maintain the value of the controlled variable in predetermined functional relationship to the value of a control signal. In FIG. 3 the modifying signals, other than the local feedback signals, one or more of which are applied separately to each individual control loop, are identified as megawatt error ($MW_e$), throttle pressure error ($TP_e$), superheat steam temperature error ($SHT_e$), reheat steam temperature error ($RHT_e$), feed water temperature error ($FWT_e$), and excess air or $O_2$ error ($O_{2e}$). FIG. 3 shows in elementary block diagram form the generation of these various modifying signals.

As shown, the feed forward control signal is transmitted over signal conductor 28 to function generators 29, 30, 31, 32, 33 and 34, the purpose of each being to condition the feed forward control signal so that the output signal therefrom is representative of the correct or set point value of the variable with which it is associated for the then existing magnitude of the feed forward control signal which in turn is representative of the desired rate of output of the power producing unit. Function generator 29 generates a set point signal corresponding to the correct feed water temperature for the then existing feed forward control signal which is compared in a difference unit 35 with a signal generated in feed water temperature transmitter 36, corresponding to the actual feed water temperature and producing an output signal corresponding to feed water temperature error ($FWT_e$). Similarly, an error signal corresponding to megawatt error ($MW_e$) is generated by comparing the output signal from function generator 30 to the output signal generated in megawatt transmitter 37 in a difference unit 38. A signal corresponding to throttle pressure error ($TP_e$) is generated by comparing the output signal from function generator 31 to the output signal generated in throttle pressure transmitter in difference unit 40. A signal corresponding to flue gas oxygen error (and inferentially excess air error) ($O_{2e}$) is generated by comparing the output signal from function generator 32 to the output signal generated in oxygen transmitter 41 in a difference unit 42. A signal corresponding to reheat steam temperature error ($RHT_e$) is generated by comparing the output signal from function generator 33 to the output signal generated in reheat steam temperature transmitter 43 in a difference unit 44. A signal corresponding to superheat steam temperature error ($SHT_e$) is generated by comparing the output signal from function generator 34 to the output signal generated in superheat steam temperature transmitter 45 in a difference unit 46.

Figure 5:
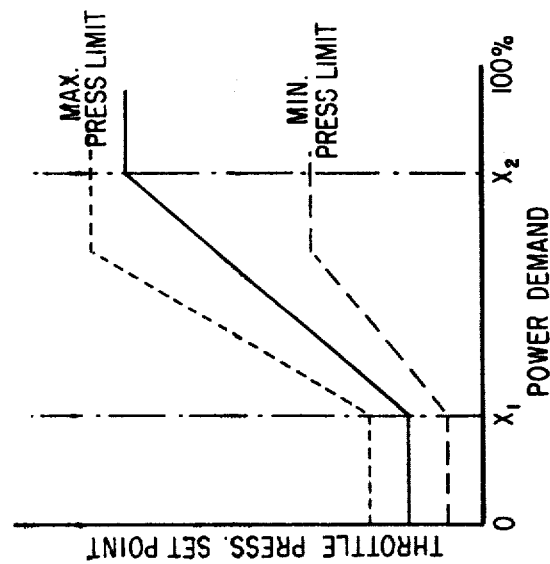
FIG. 5 is a graph useful in explaining the operation of the control shown in FIG. 4.
Figure 4:
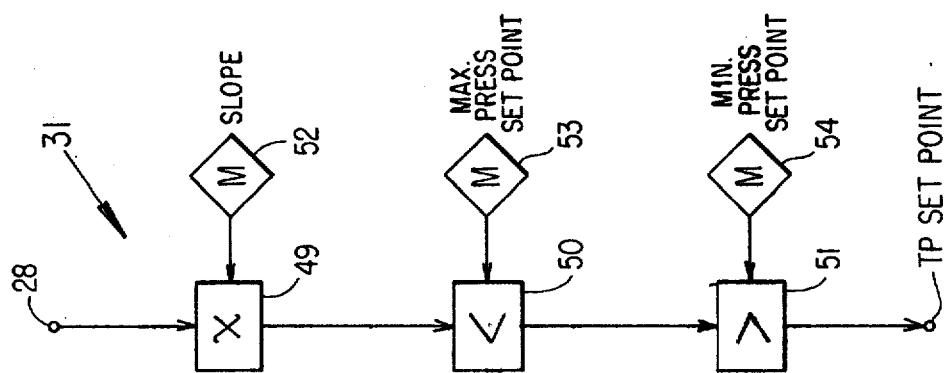
FIG. 4 is a fragmentary view showing in greater detail a part of the logic diagram shown in FIG. 3.

With respect to function generators 29 – 34 it should be noted that each may include a plurality of components as required to produce a desired set point signal. Thus, as shown, in FIG. 4, the function generator 31 may include a multiplying unit 49, a low signal selector 50 and a high signal selector 51, manually adjustable by means of units 52, 53 and 54 respectively to produce a throttle pressure set point as shown for example, in FIG. 5.

Therein the throttle pressure set point by virtue of adjustment of unit 54 remains constant at a first predetermined value until a first predetermined load $X_1$, thereafter the throttle pressure set point increases with unit load until a second predetermined load $X_2$ and thereafter remains constant at a second predetermined value. As evident the minimum pressure set point, the slope of the variable pressure set point and the maximum pressure set point are adjustable through manipulation of units 54, 52, and 53 respectively.

As evident from an inspection of FIG. 3 the itemized error signals are applied to one or more computing units, and to avoid undue complexity of the drawing the error signal conductors from difference units 35, 38, 40, 42, 44 to the relevant computing units have not been shown, it being evident, for example, that signal ($TP_e$) generated in difference unit 40 is applied to those computing units showing a ($TP_e$) input.

In regard to the control loops shown in FIG. 3 for turbine steam flow, feed water flow, fuel flow, air flow and flue gas recirculation it will be noted that certain error signals are introduced through integrating units 72, 56, 57, 58 and 59 respectively, the output signals therefrom being transmitted to multiplying units 74, 60, 61, 52 and 63 respectively and serve to apply a steady state calibration correction to the feed forward control signal. Other error signals, as shown, are introduced to summing units 73, 64, 65, 66, and 67 and serve to apply bias corrections to the feed forward control signal proportional to changes in the error signal. The particular error signals applied to make a steady state calibration correction or applied to make a bias correction depend upon the control loop in question. Thus, with respect to the feed water control loop, $SHT_e$ is applied to integral unit 56 serving to increase feed water demand when superheat steam temperature is above set point and vice versa. In order to prevent improper steady state corrections to feed water demand a signal proportional to megawatt error may be subtracted from the superheat steam temperature error in difference unit 94. Signals corresponding to feed water temperature error, superheat temperature error, throttle pressure error and megawatt error are applied as properly gained bias corrections to the feed forward control signal. In operation, a decrease in feed water temperature such as caused by the outage of a feed water heater effects a decrease in feed water flow to compensate for the decrease in turbine extraction flow and thus avoids the transient increase in power output of the power producing unit 1 that would otherwise result. A decrease in throttle pressure effects and increase in feed water flow. A decrease in power output effects a corresponding increase in feed water flow. It is evident that the corrections applied through summing unit 64 will act to stabilize operation of the power producing unit during transient conditions. The modified feed forward control signal from summing unit 64 is transmitted to final control element, valve 66.

With respect to the fuel flow control loop the feed forward control signal, modified as hereinafter described, serves to position final control element, valva 67, located in fuel supply line 23. As energy, or BTU input, should be proportional to energy, or MW, output it is evident that megawatt error should be introduced, through integral unit 57 and multiplying unit 61 to effect a steady state correction to the feed forward control signal. Applied as a bias correction through summing unit 65 are signals corresponding to changes in superheat temperature (an increase in temperature effecting a decrease in fuel flow); throttle pressure, (an increase in throttle pressure effecting a decrease in fuel flow) and megawatts, (an increase in megawatts effecting a decrease in fuel flow). Such bias corrections acting to stabilize operation of the power producing unit.

As the pounds of air required to produce a unit heat release are substantially constant, as shown in FIG. 3, rate of air flow is adjusted in accordance with changes in the feed forward control signal, with the same bias adjustments being applied through summing unit 90 as applied to the fuel control through summing unit 65, these adjustments being proportional to requred changes in BTU input to the furnace 19. A calibration adjustment to rate of air supply is provided by modifying the feed forward control signal in accordance with oxygen error (excess air error) in the flue gas. Oxygen error is applied to the feed forward control signal through integral unit 58 and multiplying unit 62. The feed forward control signal so modified adjusts final control element, damper 68, controlling the rate of air supplied for combustion.

As heretofore explained, hot reheat steam temperature may be controlled wholly or in part throughout the operating range of the power producing unit by recirculating flue gas from the outlet of economizer 18 into furnace 19 in substantially inverse proportion to boiler rating. Thus, as shown in FIG. 3, final control element, damper 69, is controlled from the feed forward control signal to substantially maintain the desired hot reheat steam temperature. $RHT_e$ is applied both as a calibration correction through integral unit 59 and multiplying unit 63, and as a bias correction through summing unit 92. Under certain conditions, such as high load, the hot reheat steam temperature may exceed set point value notwithstanding that flue gas recirculation has been reduced to minimum. To accommodate such conditions and auxiliary control may be provided such as a valve 70 controling the rate of flow of desuperheating water to a spray tube attemperator located in the cold reheat line between HP turbine 3 and reheater 11. Similarly, an auxiliary control may be provided for superheat steam temperature control. Such control may comprise a valva 71 controlling the flow of desuperheating water to a spray type attemperator located at the inlet to the secondary superheater 10. Such a control would be arranged to open valve 71 as required when superheat temperature is above set point.

With respect to the turbine steam flow control loop, the modified feed forward control signal operates turbine control valves 75. The control signal transmitted to control valves 75 can, through analog to digital circuitry and the like, be adapted to any particular type of turbine valve control mechanism.

Figure 6:
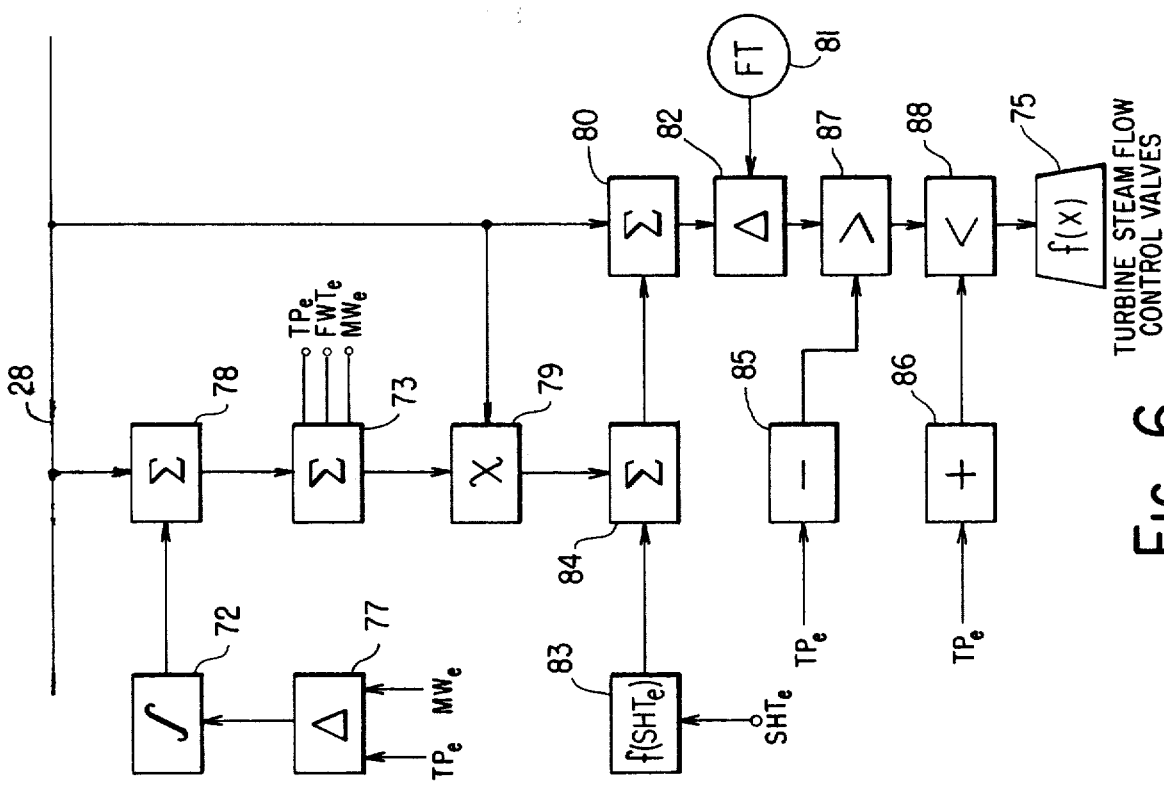
FIG. 6 illustrates a modification of the turbine steam flow control loop shown in FIG. 3.

Refering to FIG. 6, which shows a typical turbine steam flow control in greater detail, throttle pressure error is introduced through integrating unit 72 generating a correction applied to the feed forward control signal through summing unit 78. To avoid unnecessary corrections, a difference unit 77 subtracts from the throttle pressure error a properly gained megawatt error before the former is transmitted to unit 72. If both throttle pressure error and megawatt error are positive, and are in the same proportional relationship, the turbine valves remain stationary and vice versa.

If throttle pressure error is positive and the megawatt error is negative the turbine valves are positioned to increase turbine steam flow and vice versa. Additional modifying error signals such as, for example, throttle pressure error, super-heat steam temperature error, feed water temperature error, and megawatt error introduced into summing unit 73 are transmitted to multiplying unit 79, the output signal from which introduces a proportional correction to the feed forward control signal in summing unit 80. A local feedback control signal generated in turbine steam flow transmitter 81 is transmitted to difference unit 82 which generates an output signal effective to position the steam flow control valves 75 to maintain the signals transmitted to difference unit 82 equal or in predetermined relationship. While in FIG. 1 turbine steam flow is indicated as being measured by a differential pressure device located in the steam lead to high pressure turbine 3, other means such as first stage pressure may be used to measure the flow.

Figure 7:
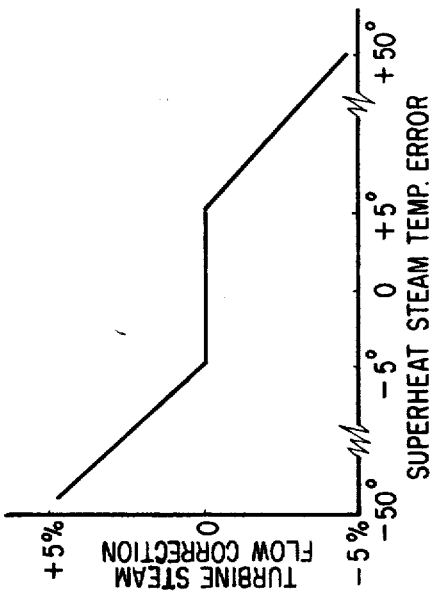
FIG. 7 is a graph useful in explaining the operation of the control loop shown in FIG. 6.

A correction, as shown in FIG. 6, for transient superheat steam temperature errors may be introduced through function generator 83 and summing unit 84. FIG. 7 shows a typical super-heat steam temperature error vs correction to turbine steam flow resulting from the modifying signal generated in function generator 83.

In normal operation the turbine steam flow control valves 75 will be positioned as required to maintain turbine steam flow demanded by the output signal from summing unit 80. The control operates, however, to prevent superheat steam pressure from exceeding predetermined minimum and maximum limits by rendering the control so far described inoperative whenever those limits are exceeded and thereafter positioning the turbine steam flow control valves to maintain the superheat steam pressure within those limits. Throttle pressure error is biased negatively in bias unit 85 and positively in bias unit 86. The output signal from bias unit 85 is transmitted to high signal selector 87 and the output signal from bias unit 86 is transmitted to low signal selector 88. Upon the superheated steam pressure increasing a predetermined amount above set point as established by negative bias unit 85, the output signal therefrom will be transmitted through high signal selector 87 and operate the turbine steam flow control valves to prevent a further increase in steam pressure. A decrease in superheated steam presure below a predetermined value operates through positive bias unit 86 and low signal selector 88 to operate the turbine steam flow control valves 75 to prevent a further decrease in steam pressure. Thus it may be said that normal operation of the turbine steam flow control loop is operative so long as superheated steam pressure is within predetermined limits, the limit controls operating to maintain steam pressure within those limits. This operation is graphically shown by the dashed lines in FIG. 5.

It will be apparent that the control system illustrated and described is by way of example only and that various modifications can be made within the scope of the invention as defined in the appended claims.

I claim:

1. In a control system for a power producing unit comprising a vapor generator provided with feed fluid and a turbine generator supplied with vapor from said vapor generator, the combination comprising, means generating a feed forward control signal corresponding to the desired power output of the power producing unit, means responsive to said signal maintaining the rate of flow of vapor to said turbine in functional relationship to said signal, means generating a signal proportional to deviations in turbine throttle pressure from set point and means rendering the feed forward control signal inoperative to control the vapor flow to the turbine and said last named signal operative to control the vapor flow to the turbine at a predetermined value of said last named signal.

2. A control system as set forth in claim 1 further including means modifying the feed forward control signal in accordance with changes in the pressure of the vapor supplied the turbine.

3. A control system as set forth in claim 1 further including means modifying the feed forward control signal in accordance with changes in the power output of the power producing unit.

4. A control system as set forth in claim 1 further including means modifying the feed forward control signal in accordance with changes in the temperature of the feed fluid supplied the vapor generator.

5. A control system as set forth in claim 1 further including means modifying the feed forward control signal in accordance with changes in the magnitudes of a plurality of parameters of said power producing unit.

6. A control system as set forth in claim 1 further including means generating a signal varying in functional relationship with the time integral of deviations in turbine throttle pressure from set point and means modifying said feed forward control signal in accordance with said first named signal.

7. A control system as set forth in claim 6 further including means generating a signal proportional to the difference between the feed forward control signal and a signal proportional to the actual power output of the power producing unit and means modifying said integral signal responsive to and proportional to the magnitude of said first named signal.

8. A control system as set forth in claim 1 further including a function generator generating an output signal varying in predetermined functional relationship with variations in the temperature of the vapor supplied the turbine and means modifying the feed forward control signal in accordance with said output signal.

9. In a control system for a power producing unit comprising a fossil fuel fired steam boiler provided with feed water supply means, air supply means and fuel supply means, and a turbine generator supplied with steam from the steam boiler, the combination comprising means generating a feed forward control signal proportional to the desired power output of the power producing unit which is independent of and unmodified by a feed back signal indicative of the state of operation of the power producing unit or of the value of any parameter thereof, a first means for adjusting the rate of flow of steam from the boiler to the turbine, a second means for adjusting the rate of flow of feed water to the boiler, a third means for adjusting the rate of flow of fuel to the boiler and a fourth means for adjusting the rate of air flow to the boiler, each of said first, second, third and fourth means solely responsive to and operated in parallel from said feed forward control signal whereby the rate of flow of steam to the turbine, the rate of flow of feed water to the boiler, the rate of fuel flow to the boiler and the rate of air flow to the boiler are each maintained in a discreet functional relationship to said feed forward control signal independent of the functional relationship existing between said feed forward control signal and any other of the said rates of flow.

10. In a control system as set forth in claim 9 further including means modifying the discrete response of each of said first, second third and fourth means in proportion to changes in the magnitudes of a plurality of parameters of said power producing unit.

11. In a control system as set forth in claim 9 further including means modifying the discrete response of said second means to said feed forward control signal in proportion to changes in the power output of the power producing unit, changes in the temperature and pressure of the steam supplied the turbine and changes in the temperature of the feed water supplied the boiler.

12. In a control system as set forth in claim 9 further including means modifying the discrete response of said third means to said feed forward control signal in proportion to changes in the power output of said power producing unit and changes in the pressure and temperature of the steam supplied the turbine.

13. In a control system as set forth in claim 9 further including means modifying the discrete response of said third means to said feed forward control signal in proportion to the time integral of deviations in the flue gas oxygen content from set point.

14. In a control system as set forth in claim 9 further including means modifying the discrete response of said fourth means to said feed forward control signal in proportion to the time integral of the difference between the magnitude of said feed forward control signal and a signal corresponding to the actual power output of the power producing unit.

15. In a control system as set forth in claim 9 further including means modifying the discrete response of said fourth means in proportion to changes in the power output of the power producing unit and changes in the pressure and temperature of the steam supplied the turbine.

16. In a control system as set forth in claim 9 wherein the boiler is provided with a reheater and means for recirculating flue gas to the boiler for controlling the temperature of the steam discharged from the reheater, the combination further comprising, a fifth means for adjusting the rate of flow of recirculated flue gas, said fifth means discretely responsive to and operated in parallel from said feed forward control signal with said first, second third and fourth means.

17. In a control system as set forth in claim 16 further including means modifying the discrete response of said fifth means to said feed forward control signal in proportion to changes in the temperature of the steam discharged from the reheater.

18. In a control system as set forth in claim 16 further including means modifying the discrete response of said fifth means to said feed forward control signal in proportion to the time integral of deviations in the temperature of the steam discharged from the reheater from set point.

* * * * *

PO-1050
(5/69)

UNITED STATES PATENT OFFICE
CERTIFICATE OF CORRECTION

Patent No. 3,894,396                     Dated    July 15, 1975

Inventor(s)   Oliver W. Durrant

It is certified that error appears in the above-identified patent and that said Letters Patent are hereby corrected as shown below:

Column 3, line 15, change "opertion" to - operation - .

Column 3, line 62, after "transmitter" insert - 39 - .

Column 4, line 33, after "44," insert - 46 - .

Column 4, line 43, change "52" to - 62 - .

Column 4, line 46, change "66, and 67" to - 90 and 92 - .

Column 5, line 2, change "and" to - an - .

Column 5, line 12, change "valva" to - valve - .

Column 5, line 57, change "and" to - an - .

Column 5, line 59, change "tube" to - type - .

Column 5, line 63, change "valva" to - valve - .

Claim 13, line 3, change "third" to - fourth - .

Claim 14, line 3, change "fourth" to - third - .

Signed and Sealed this fourth Day of November 1975

[SEAL]

Attest:

RUTH C. MASON
*Attesting Officer*

C. MARSHALL DANN
*Commissioner of Patents and Trademarks*